United States Patent [19]

Gorynin et al.

[11] Patent Number: 5,302,182
[45] Date of Patent: Apr. 12, 1994

[54] METHOD OF PREPARING PARTICLES WITH A CONTROLLED NARROW DISTRIBUTION

[75] Inventors: Igor V. Gorynin; Boris V. Farmakovsky; Alexander P. Khinsky; Karina V. Kalogina, all of Leningrad, U.S.S.R.; Alfredo Riviere V., Caracas, Venezuela; Julian Szekely, Weston; Navtej S. Saluja, Cambridge, both of Mass.

[73] Assignee: Technalum Research, Inc., Cambridge, Mass.

[21] Appl. No.: 755,074

[22] Filed: Sep. 5, 1991

[51] Int. Cl.$^5$ .............................................. B05B 3/02
[52] U.S. Cl. ........................................ 75/334; 75/352; 75/355
[58] Field of Search ............... 75/331, 334, 352, 355, 75/357; 264/8

[56] References Cited

U.S. PATENT DOCUMENTS

| | | | |
|---|---|---|---|
| 2,305,172 | 12/1942 | Landgraf | 264/8 |
| 2,306,449 | 12/1942 | Landgraf | 264/8 |
| 2,356,599 | 8/1944 | Landgraf | 75/334 |
| 3,229,923 | 1/1966 | Conley et al. | |
| 3,338,688 | 8/1967 | Lange | |
| 3,817,460 | 6/1974 | Alpha | |

FOREIGN PATENT DOCUMENTS

| | | |
|---|---|---|
| 322340 | 5/1975 | Austria . |
| 325396 | 10/1975 | Austria . |
| 362289 | 5/1981 | Austria . |
| 0008604 | 3/1980 | European Pat. Off. . |
| 159854 | 1/1904 | Fed. Rep. of Germany . |
| 1291605 | 3/1969 | Fed. Rep. of Germany . |
| 1296943 | 6/1969 | Fed. Rep. of Germany . |
| 551424 | 4/1923 | France . |
| 1560321 | 4/1990 | U.S.S.R. . |
| 943319 | 12/1963 | United Kingdom . |
| 1101981 | 2/1968 | United Kingdom . |
| 1170792 | 11/1969 | United Kingdom . |
| 1335922 | 10/1973 | United Kingdom . |
| 2020693A | 11/1979 | United Kingdom . |
| 2047104A | 2/1980 | United Kingdom . |

OTHER PUBLICATIONS

F. H. Froes, "Examining Rapidly Solidified Materials", *Journal of Metals*, Conference Review, pp. 33–35 (Aug. 1986).

Alan Lawley, "Modern Powder Metallurgy Science and Technology", *Journal of Metals*, AIME Henry Krumb Lecture, pp. 15–25 (Aug. 1986).

A. Lawley, "Powder Metallurgy Processing: A Perspective for North America", *Power Metallurgy, Global Review*, 33(3):217 (1990).

Nicholas J. Grant, "Rapid Solidification of Metallic Particulates", *Journal of Metals*, pp. 20–27 (Jan. 1988).

Primary Examiner—George Wyszomierski
Attorney, Agent, or Firm—Choate, Hall & Stewart

[57] ABSTRACT

The method for preparing metal powders with a narrow particle size distribution includes providing a disintegrator with a working chamber containing counter-rotating disks equipped with teeth designed to impart high tangential velocities to particles contacting the teeth, introducing a metal melt as a liquid stream with a composition substantially corresponding to the final metal powder composition into the working chamber of the disintegrator, counter-rotating the disks, whereby the liquid stream of metal entering the chamber is broken up into small beads, which leave the surface of the teeth with high velocities, and whereby subsequent contact of the beads with the teeth of the disks further break up the liquid beads until the bead solidifies by heat loss to the disks and collecting a fine metal powder of narrow particle size distribution at the exit end of the working chamber.

19 Claims, 4 Drawing Sheets

METHOD OF PREPARING PARTICLES WITH A CONTROLLED NARROW DISTRIBUTION

BACKGROUND OF THE INVENTION

This invention relates to a method of preparing fine metal powder with a narrow particle size distribution. This invention further relates to a method of preparing amorphous and microcrystalline metals.

Metal powders are prepared commercially using chemical, electrolytic, mechanical comminution, plasma melting and atomization methods. In all processes, control over powder chemistry, cleanliness, size and shape is important.

Elemental and prealloyed metals powders are typically prepared by atomization processes. In water atomization, disintegration of the molten metal stream is brought about by impact from a high pressure stream of water. Large quantities of energy are used and the efficiency of the process of preparing particles with controlled narrow distribution is low. In general, water-atomized particles are irregularly shaped with rough oxidized surfaces.

The principle of gas-atomization is similar to that of water-atomization. A continuous stream of molten metal is broken down into droplets by a subsonic or supersonic gas stream. The particles are normally spherical and relatively smooth. However, like the water-atomization process, the process has low overall efficiency. The particle sizes obtained from these processes depends on random factors.

Reducing the number of processing steps necessary to obtain fine metal powders of narrow particle size distribution is desirable from a reduced costs and improved processing conditions standpoint.

SUMMARY OF THE INVENTION

The present invention provides a method for preparing fine metal powders with a narrow particle size distribution in a one-step process.

According to the method of the present invention, the working chamber of a disintegrator apparatus is equipped with counter-rotating disks including teeth designed to impart high tangential velocities to particles contacting them. A metal melt is introduced into the working chamber as a liquid stream. The metal stream strikes the teeth of the counter-rotating disks, whereby the metal stream is broken up into small liquid beads, which leave the surface of the teeth with high tangential velocities. The liquid beads are subjected to further contact with the rapidly moving teeth until the beads finally solidify into metal particles by heat transfer to the working chamber. The melt may be introduced at the radial periphery of the working disks at a position above the axis of horizontal rotation. The melt may be added from directly above the working chamber or means can be provided to supply the melt along the side of the working chamber.

The metal melt can be composed of a single metal or a molten alloy. Any material capable of melting and resolidifying can be used in this process. In particular, powders of transition metals, rare earth metals, alkaline and alkaline earth metals, aluminum, boron, silicon and their alloys can be prepared using this method. The temperature of the metal melt should be at least 100° C. above the liquidus temperature. The process may be carried out in an air, vacuum, inert or weakly reducing atmosphere.

In preferred embodiments, the counter-rotating disks rotate at a velocity of at least 3000 rpm and may range up to 24,000 rpm. In other preferred embodiments, the counter-rotating disks rotate at a velocity preferably of at least 10,000 rpm, and more preferably of 12,000–18,000 rpm. The rate of cooling of the melt is preferably at least $10^3$ °C./sec, and more preferably at least $10^5$ °C./sec. The rapid cooling rate of the liquid beads provides metal powders that are amorphous or microcrystalline.

A single treatment of a metal melt according to the method of the invention gives metal powders with >99% of the powder having a particle size less than 200 μm and >40% of the powder having a particle size less than 100 μm. A subsequent pass of the powders through the disintegrator results in even finer particles with required size distribution.

DESCRIPTION OF THE PREFERRED EMBODIMENT

Figure 1:
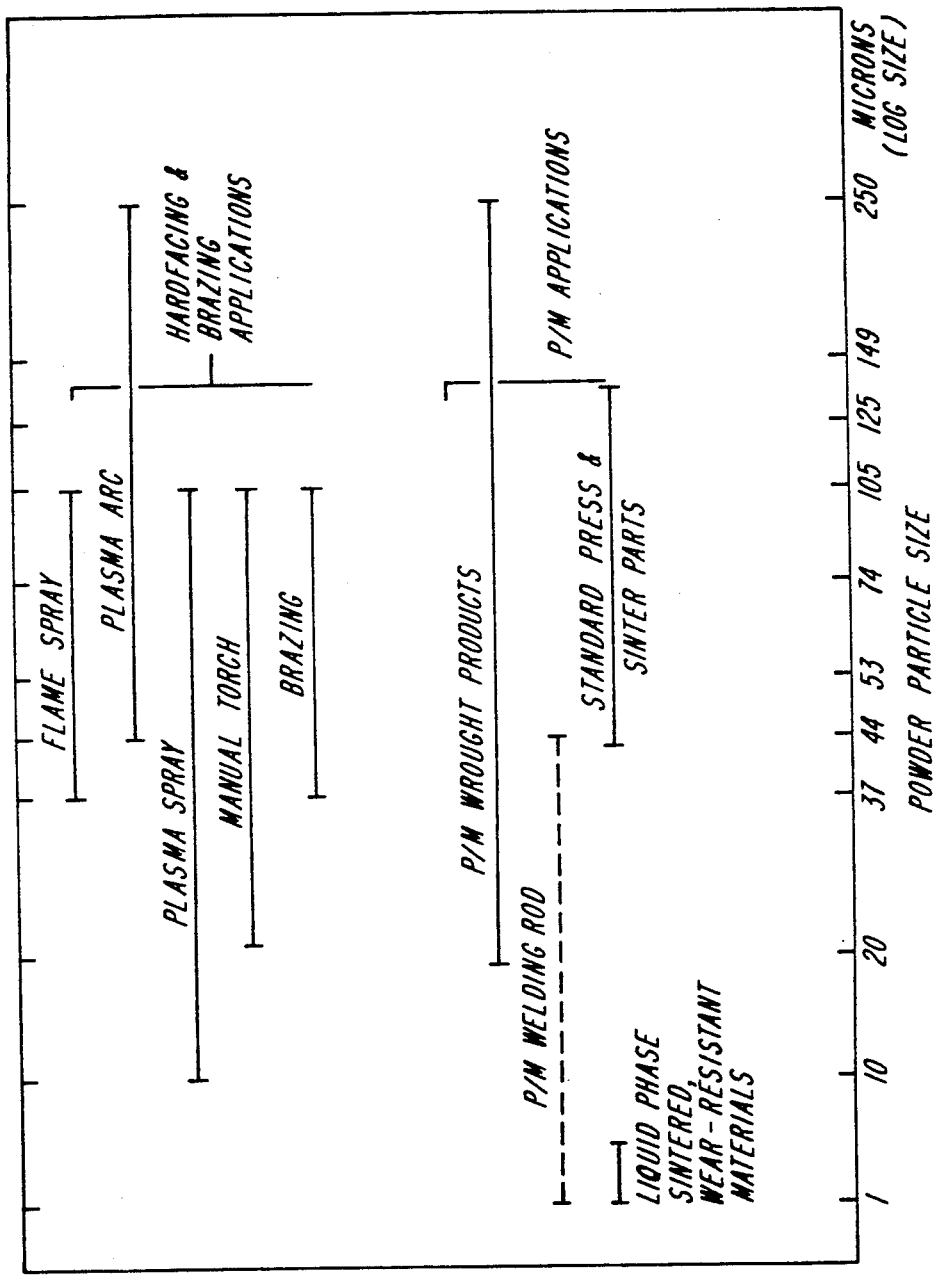
FIG. 1 shows powder processing methods and products formed as a function of particle size from conventional methods.

As described above, the present invention relates to a method of producing fine metal powders with a narrow particle size distribution. It is difficult to get a narrow particle size distribution of powders using conventional methods. FIG. 1 taken from J. Met. August (1986), pp. 15–25, lists the conventional methods of powder processing and the typical particle size distributions obtained by these methods.

Figure 2:
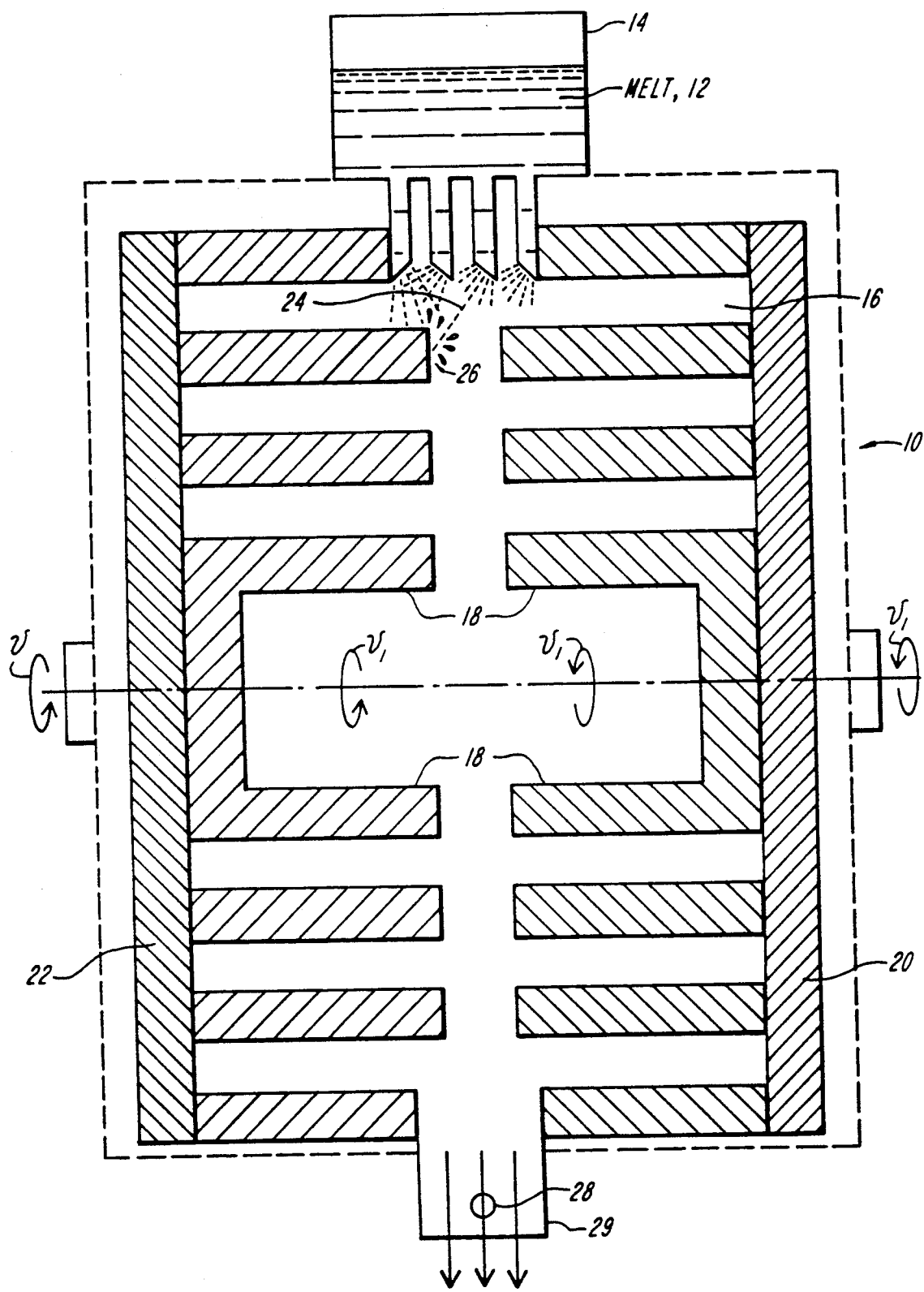
FIG. 2 shows a cross-sectional view of the apparatus used in the processing of a metal melt.

FIG. 2 is a cross-sectional view of a disintegrator apparatus 10 used in the present invention. A metal melt 12 is introduced from a feeder 14 into a working chamber 16 of the disintegrator apparatus 10. Teeth 18 which are attached to plate-like disks 20 and 22 are designed to accelerate the particles that strike their surface. When metal melt 12 enters the working chamber as a liquid stream 24, it contacts the teeth 18 of the disintegrator 10. The stream of liquid 24 is broken into smaller beads 26. In the process, heat is transferred from the liquid melt to the heat sink of the chamber 16 and disks 20 and 22. Liquid beads 26 are subjected to further collisions, accelerations and heat loss until the beads solidify as a metal powder 28, which is collected at an exit end 29 of the working chamber 16.

Disintegrator apparatus are usually equipped with teeth designed to crush powders into smaller particles. In the present invention, however, the teeth of the disintegrator apparatus have been modified so that the principle role they play is that of accelerating the liquid which strikes their surfaces. This imparts the high tangential velocities to the beaded metal necessary for the thorough break up of the bead into ever finer particles.

Figure 3:
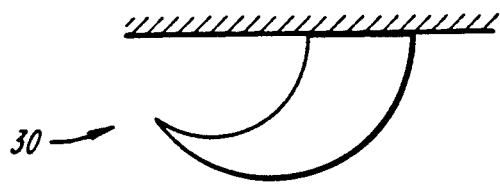
FIG. 3 illustrates the teeth configuration of counter-rotating disks used in the art to crush particles.
Figure 4A:
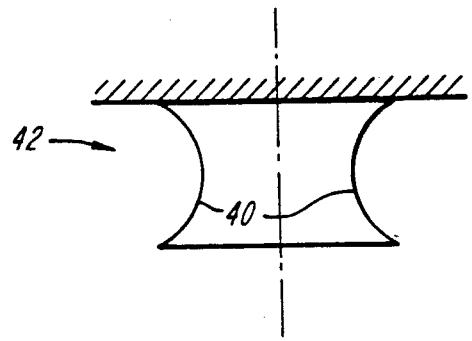
FIGS. 4A, 4B, and 4C illustrate several teeth configurations of the counter-rotating disks used in the practice of the present invention.
Figure 4B:
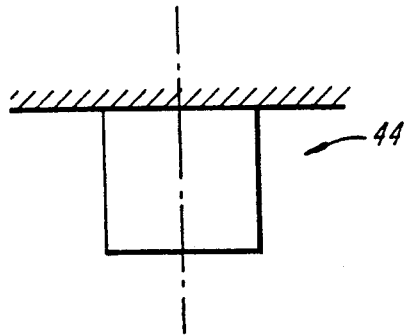
Figure 4C:
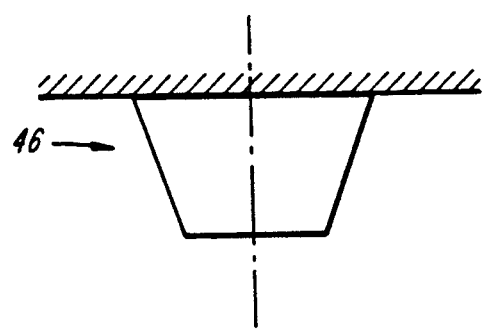

A typical tooth design 30 of a disintegrator apparatus used in the art is hook-like as shown in FIG. 3 which enable it to crush particles that it contacts. FIG. 4 illustrates the modified disintegrator teeth used in the present invention. The broad flat surfaces of the teeth propel the material from the surface. Broad working surfaces 40 of a tooth design 42 shown in FIG. 4a provides the greatest resistance to the metal beads and is hence the most optimal shape. However, it is difficult to machine. Teeth designs 44 and 46 shown in FIG. 4b and 4c, respectively, perform adequately and are easier to machine. Velocities of moving particles up to 400 m/s (greater than the speed of sound) are possible.

Upon collision and subsequent rebound of the liquid beads from the surface of the disintegrator teeth 18, the liquid beads 26 experience a high tangential velocity. The high velocity prevents the beads from splat quenching and sticking onto the teeth of the apparatus. Further, the high velocity of the liquid beads 26 allows further useful collisions to occur with subsequent partitioning of the beads before solidification. It is estimated that collisions occur at a rate of $10^4$ collisions/second. However, dwell time of the material in the disintegrator chamber is considerably less than a second.

The liquid beads 26 have tangential velocities preferably in the range of 150-450 m/s, and more preferably in the range of 200-400 m/s. These high velocities result in rapid cooling rates of $10^3$ to $10^5$ deg/sec. Rapid solidification gives metal powders that are either amorphous or microcrystalline.

The main factors that influence the particle size during melt processing are the velocity of rotation, the degree of superheating and the chemical composition of the melted material. As would be expected, an increase in the rate of rotation of the disintegrator disks resulted in a decrease in the average particle size of the resulting powder. The disks counter-rotate relative to one another. Typical speeds for each disk are preferably more than 10,000 rpm and more preferably 12,000-18,000 rpm. Theoretical calculations suggest that when the disk rotation rate is greater than 12,000 rpm, the prevailing fraction will have a particle size of 50-63 μm. At higher rpm (up to 24,000), a majority (80%) of the powder will have a particle size of less than 50 μm. Subsequent processing of the powders through the disintegrator will give even narrower particle sizes and distribution.

It is desirable to maintain the temperature of the metal melt 12 as high as possible above the liquidus temperature. The higher the initial temperature of the melt, the more collisions and subsequent fractures of the liquid beads before solidification. This results in a finer final powder. A temperature of 50° C. above the liquidus temperature is preferable. A temperature of 100° C. above the liquidus temperature is more preferable.

The different surface tensions of melted metals also affects the particle size distribution of the final powder. A higher surface tension makes it more difficult to break up the metal droplets and hence, the particle dimensions increase.

Figure 5:
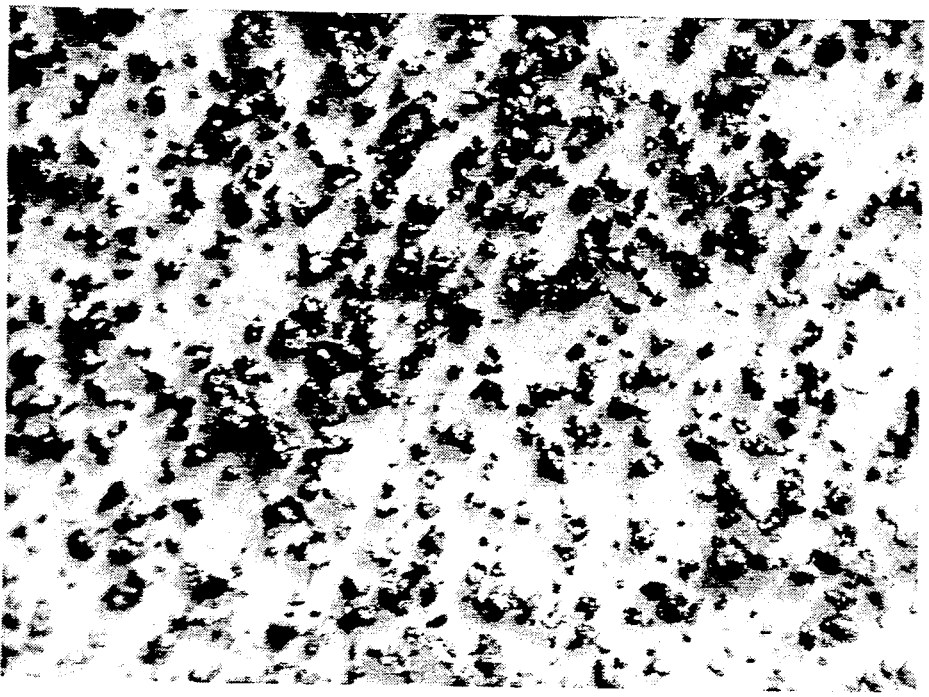
FIG. 5 shows a optical photomicrograph of particles prepared from a Sn-Si melt.

In a typical example, a metal melt of 5 wt % silicon and the balance tin was prepared and processed according to the method of the invention. FIG. 5 shows Si-Sn particles with an average particle size of 20-30 μm.

Aluminum alloyed with up to 8 wt % iron and silicon have been prepared in the following manner. The melt was superheated up to 280° C. above its liquidus temperature. The powders were processed using disk speeds of up 3000 rpm. The particle size distribution was determined by the sieving method and is reported in Table 1. 99.7 wt % of the powder is has a particle size smaller than 200 μm and 41 wt % of the powder has a particle size smaller than 100 μm. The disk speeds were much slower than optimal which resulted in a higher average particle size.

Processing the powders through the disintegrator for a second time can result in significantly reduced particle size.

Figure 6:
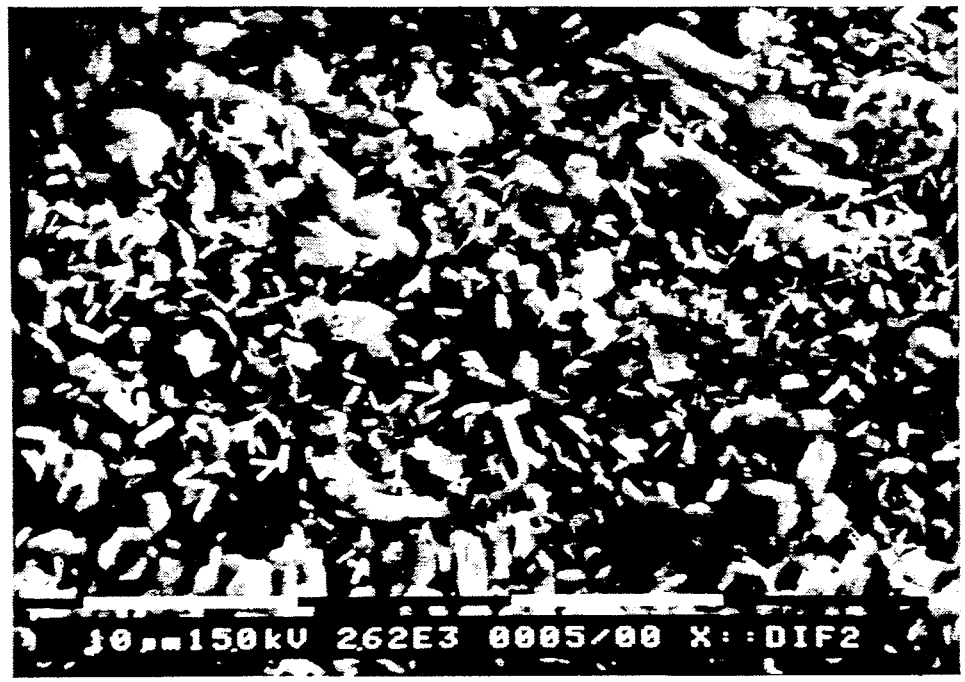
FIG. 6 shows scanning electron photomicrograph of particles prepared from an Al-Fe-Ce melt.

FIG. 6 shows an Al-Fe-Ce amorphous powder where the major fraction is less than 10 μm.

TABLE 1

| Particle Size Distribution of Al—Fe—Si Metal Powders. | |
|---|---|
| particle size (μm) | weight percent |
| >200 | 0.3 |
| 150-200 | 28.4 |
| 100-150 | 30.6 |
| 63-100 | 34.2 |
| <63 | 6.5 |

What is claimed is:

1. A method for preparing a metal powder, comprising the steps of:
   positioning at least two rotatable surfaces in a working chamber in facing relationship so as to define at least one gap between at least a portion of said facing surfaces, at least a portion of said facing surfaces having teeth disposed thereon which project into said gap;
   introducing a molten metal stream into said gap;
   rotating said surfaces along an axis of rotation substantially orthogonal to a direction of introduction of said molten metal stream, whereby small particles of molten metal are formed within said gap by contacting said molten stream with said teeth;
   solidifying said particles by heat loss to said disks and working chamber; and
   collecting said particles.

2. The method of claim 1, wherein said axis of rotation comprises a common axis for each of said surfaces.

3. The method of claim 1, wherein said axis of rotation comprises a unique axis for each of said surfaces.

4. The method of claim 1, wherein said at least two surfaces are counter-rotated.

5. The method of claim 1, wherein said metal powder comprises one or more metals.

6. The method of claim 1, wherein said molten stream of metal is not less than 50° C. above its liquidus temperature.

7. The method of claim 1, wherein said molten stream of metal is not less than 100° C. above its liquidus temperature.

8. The method of claim 1, wherein said metal is selected from the group consisting of transition metals, rare earth metals, alkaline and alkaline earth metal, aluminum, boron, and silicon and their alloys.

9. The method of claim 1, wherein said at least two surfaces are rotated at a velocity in the range of 3000 to 24,000 rpm.

10. The method of claim 1, wherein said at least two surfaces are rotated at a velocity greater than 10,000 rpm and less than 18,000 rpm.

11. The method of claim 1, wherein said at least two surfaces are rotated at a velocity of 12,000-18,000 rpm.

12. The method of claim 1, wherein said solidified particles comprise a microcrystalline structure.

13. The method of claim 1, wherein said solidified particles comprise an amorphous structure.

14. The method of claim 1, wherein said process is carried out in an atmosphere selected from the group consisting of air, vacuum, inert atmosphere and weakly reducing atmosphere.

15. The method of claim 1, wherein said heat loss occurs at a rate of not less than $10^3$ deg/sec.

16. The method of claim 1, wherein said heat loss occurs at a rate not less than $10^5$ deg/sec.

17. The method of claim 1, wherein the step of introducing said molten metal stream comprises introducing said molten stream from above said working chamber.

18. The method of claim 1, wherein the step of introducing said molten metal stream comprises introducing said molten stream from a side of said working chamber.

19. A method for preparing a metal powder, comprising the steps of: providing a working chamber containing at least two disks disposed therein;

positioning said at least two disks in facing relationship so as to defined at least one gap between at least a portion of said facing surfaces of said disks, at least a portion of said facing surfaces of each said disks having teeth disposed thereon which project into said gap;

counter-rotating said disks along a substantially horizontal axis of rotation;

introducing a molten stream of metal into said at least one gap, whereby small particles of molten metal are formed within said at least one gap by contacting said molten stream with said teeth;

solidifying said particles by heat loss to said disks and working chamber; and collecting said particles.

* * * * *

UNITED STATES PATENT AND TRADEMARK OFFICE
CERTIFICATE OF CORRECTION

PATENT NO. : 5,302,182
DATED : April 12, 1994
INVENTOR(S) : Igor V. Gorynin, et. al.

It is certified that error appears in the above-indentified patent and that said Letters Patent is hereby corrected as shown below:

Column 4, line 5: after "powder" please delete "is"; and

Column 6, line 5: please delete "defined" and insert therefor -- define --.

Signed and Sealed this

Twenty-eight Day of March, 1995

*Attest:*

BRUCE LEHMAN

*Attesting Officer*     *Commissioner of Patents and Trademarks*